Aug. 14, 1956 L. L. SPEIDELL 2,758,407
FISHING APPARATUS
Filed Aug. 8, 1952
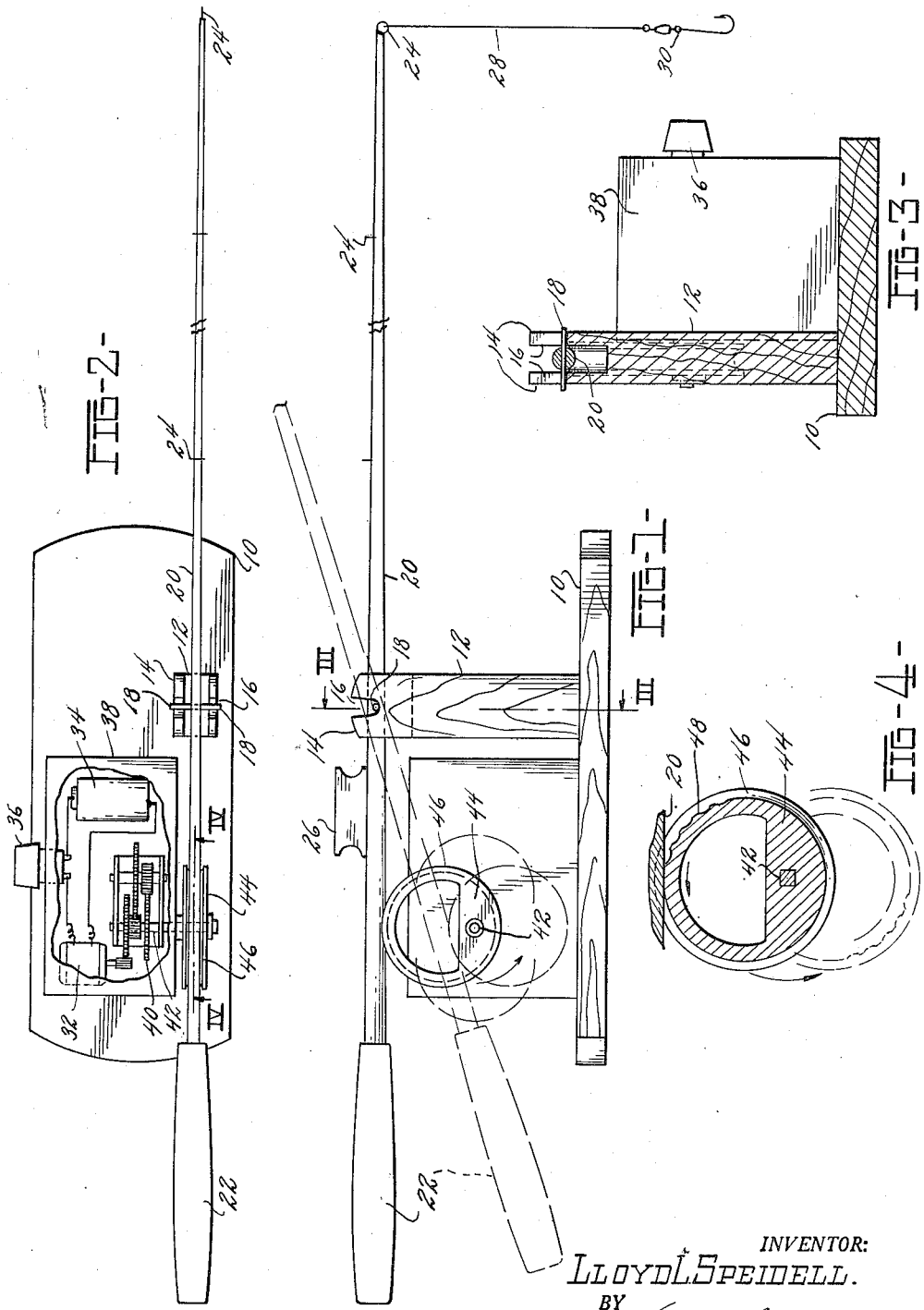
INVENTOR:
Lloyd L. Speidell.
BY
Wm. O. Ballard
his attorney

United States Patent Office 2,758,407
Patented Aug. 14, 1956

2,758,407

FISHING APPARATUS

Lloyd L. Speidell, Toledo, Ohio

Application August 8, 1952, Serial No. 303,217

2 Claims. (Cl. 43—19.2)

This invention relates to fishing apparatus.

An object of this invention is to provide a fishing rod particularly adapted for winter or through-the-ice fishing.

Another object of this invention is to provide a novel supporting structure for a fishing rod.

Another object of this invention is to provide a supporting structure for a fishing rod which structure will impart a rocking or other desirable movement to the rod.

And another object of this invention is to provide a fishing rod support which not only rocks the fishing rod, but also imparts additional desirable movement to the rod during the rocking thereof, such movements being reproductions of normal luring gestures normally imparted by manual movement.

Other objects and advantages of this invention relating to the arrangement, operation and functions of the related elements of the structure, to various details of construction, to combination of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation of a fishing rod shown mounted on the rocking support therefor;

Fig. 2 is a plan view of the device in Fig. 1;

Fig. 3 is a view of the line III—III, Fig. 1; and

Fig. 4 is a view of the line IV—IV, Fig. 2.

Base plate 10 serves as a foundation for column or post 12, the upper portion of which is bifurcated to provide a pair of spaced parallel plates 14 centrally grooved by aligned seats 16.

These seats 16 serve as a fulcrum for pin 18 diametrically extending through fishing rod 20 intermediate its length, thus providing trunnions for a rocking mount of the rod 20 on the fulcrum 16. The rod 20 is provided with handle 22, line guides 24, and line supply support 26, from which line 28 may extend through the guides 24 to selected gear 30, including a hook for bait.

In fishing through ice it is an accepted practice to impart a steady reciprocation to the bait by rhythmically lifting and dropping a line by manipulation of the rod.

The handle 22 herein is of a weight to approximately counterbalance the rod on its fulcrum so that a close balance is obtained and rocking of the rod requires but a modicum of power. The handle 22 is, however, of sufficient weight to depress that portion of the rod.

Power rocking is desirable, and to this end a novel drive is herein disclosed. Electric motor 32 receives its power supply from battery 34, which may be a single cell flashlight battery. The flow of current is controlled by switch-rheostat 36, all mounted in and on a suitable housing 38 also on the base 10 adjacent column 12.

The housing 38 may also contain a speed reduction transmission 40 between the motor 32 and driven shaft 42. This shaft 42 extends outwardly from the housing 38 to have wheel 44 eccentrically keyed thereon, which wheel has its periphery grooved to provide a cam 46 upon which a section of the rod 20 adjacent the handle 22 may be supported.

By operation of the switch 36 the wheel 44 is steadily rotated and the cam action on the rod will rock the rod on the trunnions provided by pin 18.

Under certain conditions some fishermen prefer imparting an additional action to the hook 30 beyond a steady reciprocation, such as a jiggling effect. This action is duplicated by the device herein by providing contour pattern 48 to the face of said groove 46, which pattern imparts a predetermined movement to the rod, hence to the gear. This contour pattern 48 may be of various duration and at any selected arc about the wheel 44, so that various movements may be developed in accordance with the individual desires of a user of the device herein.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and it is desired to secure by United States Letters Patent:

1. Fishing apparatus including a fishing rod provided with a pair of trunnions intermediate its length, a fulcrum mount for the trunnions, a motor and transmission driven thereby, and an eccentrically mounted wheel rotated by said transmission, said wheel having a grooved periphery including a circumferentially undulated extent engaging said rod, said undulated extent developed to impart a teetering movement of the fishing rod as said wheel is rotated in contact therewith.

2. The structure set forth in claim 1 wherein the trunnions are upwardly open and the rod rests on said wheel whereby said rod may be freely lifted from said apparatus.

References Cited in the file of this patent

UNITED STATES PATENTS

| 819,649 | Ham | May 1, 1906 |
| 1,331,076 | Mitchell | Feb. 17, 1920 |
| 2,567,777 | Massino | Sept. 11, 1951 |
| 2,578,632 | Miller | Dec. 11, 1951 |
| 2,624,972 | Burg | Jan. 13, 1953 |
| 2,643,478 | Paulsen | June 30, 1953 |
| 2,663,962 | King | Dec. 29, 1953 |